Aug. 26, 1930. C. H. BRASELTON ET AL 1,774,415
PUMP
Original Filed Feb. 1, 1922
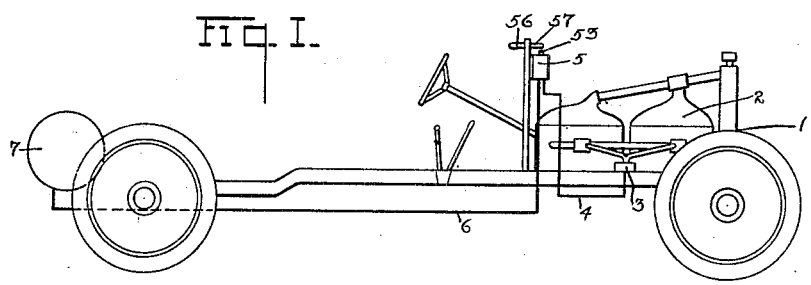
Fig. I.
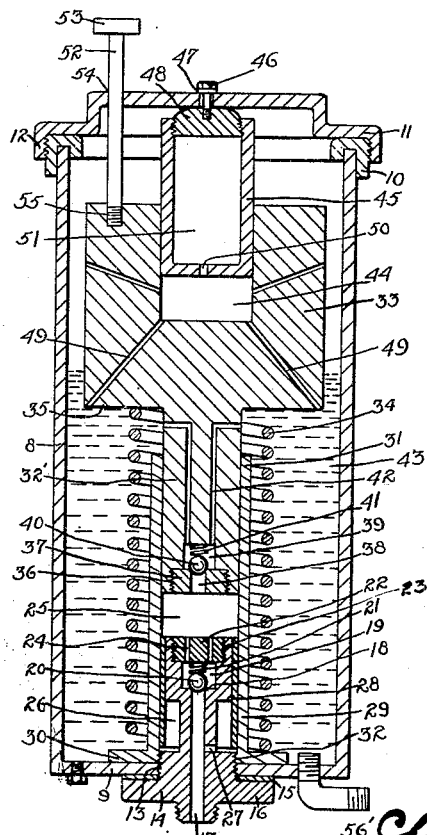
Fig. II.
Inventors
Chester H Braselton
and Fred B. MacLaren
By Chester H Braselton Attorney Patented Aug. 26, 1930

1,774,415

UNITED STATES PATENT OFFICE

CHESTER H. BRASELTON, OF NEW YORK, AND FRED B. MacLAREN, OF MALBA, NEW YORK

PUMP

Application filed February 1, 1922, Serial No. 533,492. Renewed August 7, 1924.

This invention relates to vibration pumps for fluids of the type wherein vibration of the housing or casing carrying the pump mechanism in cooperation with inertia elements brings about a relative movement between a piston and its cylinder for the purpose of pumping fluids from one vessel to another or to the pump tank itself. The construction is an improvement over that shown in our co-pending application entitled "Fuel supply system", Serial No. 566,292.

The invention is shown as applied to use in connection with an automobile for pumping liquid fuel from the rear tank of relatively low level to a higher auxiliary tank from which the liquid fuel will flow by gravity to the carburetor. The invention of course, has other uses besides in connection with moving vehicles but that application is shown as illustrative of one method of using our invention.

One of the objects of the invention is to provide a dampening means for controlling the operation of the pumping mechanism so that the pumping will be reduced when the height of the liquid in the receiving chamber reaches a certain approximate level.

The invention further relates to various details of construction and design as will hereinafter appear from reference to the accompanying drawings forming a part of this specification, and in which, Figure I is representative, in a conventional way, of an automobile with our invention applied thereto.

Figure II represents a vertical sectional view through the pump tank of Figure I, showing the various details of our invention.

In the drawings 1 represents an automobile with the usual chassis, engine, wheels, axles, etc. The engine 2 is fed with liquid fuel from a carburetor 3 which is supplied with liquid fuel through pipe 4 by gravity from pump tank 5 shown in Figure I as mounted on the dash in any convenient manner. This pump tank serves to pump fuel through pipe 6 from rear tank 7 of lower level than the pump tank. The application of our invention herein disclosed makes use of the vibration of the automobile or parts thereof, such as the dash, when the car is running over the road, or of the vibration of the dash or pump tank due to the engine vibration when the car is standing still for pumping liquid fuel from the tank 7 up to the pump tank 5 which serves as an auxiliary reservoir for feeding fuel by gravity to the carburetor.

Referring to Figure II, 8 represents the casing of the pump tank preferably made of pressed metal so that the sides and bottom 9 are integral. The cap or top is formed with two pieces of pressed metal 10 and 11 of the form shown. Part 10 is soldered permanently on to the top of the casing 8 and the downwardly turned flange around the periphery of the tank is threaded to receive the thread in the inside of the downwardly turned flange 12 of cap 11 so that cap 11 is removably attached to the cap 10.

The bottom 9 of the tank is provided with an aperture 13 at its center which is threaded to receive the threads on the nut 14 which contains one of the valves for the pumping mechanism. A gasket 15 is placed between the peripheral flange 16 and the bottom 9 to make a tight fit when the nut is screwed in place. The nut 14 has a central hole 17 extending from its bottom end to valve seat 18 at the upper edge of the counterbored hole 19 in the upper end of the nut 14. A ball valve 20 is normally held to close the opening 17 at its upper end on the valve seat 18 by means of a spring 21 the upper end of which rests against the bottom of nut 22 screwing in another counterbore 23 in the upper end of the nut 14. This nut 22 has openings 24 leading from the space around the ball valve 19 to the space 25 above the upper end of the nut 14 which space represents the pumping space of the pump.

A groove 26 is cut in the periphery of the nut 14 intermediate its end, and port 27 forms a passage for fluid between the space 26 and the central hole 17 in the nut 14. A sleeve 28 is placed tightly around the upper end of the nut 14 for a liner and this is preferably made of brass or good wearing and fitting material. The fit such that for all purposes of operation this sleeve is really a part of the nut 14 and is stationary with it, Around the sleeve 28 is mounted a cylinder 29 having an outwardly bent flange 30 at its bottom resting on the bottom of the tank. This cylinder projects much higher than the nut 14 and as shown in the drawings, almost one-half as high as the tank, terminating at its upper end at 31. This cylinder is also threaded at 32 so that the nut 14 in screwing into the bottom 19 of the tank likewise screws into the inside of the bottom of the cylinder 29 so that this cylinder, nut 14, and sleeve 28 are all rigid to each other at all times although they may be easily separated for assembly or disassembly when desired.

Fitting in the upper end of the cylinder 29 in a fairly loose fit, is the lower end 32' of a piston element, the upper end 33 of which is made larger and heavier so that this piston is a relatively heavy piston and may serve as an inertia element whereby relative movement between it and the cylinder will take place when the casing 8 of the pump and the cylinder 29 are vibrated. The piston is normally held at a point of balance by coil spring 34 the upper end of which acts against the under shoulder 35 of the part 33 of the piston head and the lower end of which rests upon the top of flange 30. This piston is counterbored at its bottom end at 36 to receive a nut 37 threaded to screw in the counterbore and having an opening 38 connecting the space 25 with an aperture 39 just above the nut in which is held a ball 40 making a seat with the upper side of the nut. A small spring 41 holds the ball normally against its seat. Holes 42 connect the space 39 with the liquid receiving space 43 around the outside of the cylinder 29. These holes communicate to the periphery of the piston at a point above the top of the cylinder 31.

The head 33 of the piston is provided with a chamber 44 in which fits a damper 45 universally held by a bolt 46 at its top end fitting in a hole 47 in the cap of the tank, larger in diameter than the bolt so that the damper 45 is free to move horizontally to properly locate itself in the opening 44. The bolt 46 screws into a nut 48 screwing into a threaded end of damper 45 at the top and this nut 48 is rounded on its top where it engages the inside of cap 11 thus further to provide a universal connection between the damper 45 and the cap 11. The periphery of damper 45 loosely fits the inside of chamber 44 so that as the piston head 33 moves up and down when the pump is vibrated the same will move up and down over the damper 45. The space 44 in the piston head 33 is connected by openings 49 with the outer tank chamber 43 and the bottom of damper 45 has an opening 50 of small diameter connecting the space 51 in the damper with the space 44 in the piston head.

A rod 52 having a handle 53, loosely fits through an opening 54 of the cap 11 and extends down through the same and is screw threaded in opening 55 in the top of the piston head. By manually pulling up and down on the rod 52 the piston may be pushed up and down accordingly to operate the pumping mechanism by hand if desired at any time. A lever 56, mounted on the dash, has one end 57 extending over the handle 53 so that by operating the forward end of lever 56 upwardly from the dash rod 53 and with it the piston will be pushed down to operate the pump and when this lever is released the spring 34 will return the piston to its upper position. A few strokes of the lever 56 in this way or by operating the rod 52 direct will quickly pump the chamber 43 full of liquid from the rear tank.

The operation of the device is as follows. The vibration of the car or the engine running serves to vibrate the tank casing 8 up and down and inasmuch as the piston loosely fits in the cylinder 29 and is relatively heavy, the same acts as an inertia element and will not follow exactly the movements of the cylinder 8. As the casing 8 is therefore vibrated relative movement between the piston and the cylinder 29 takes place to the end that when the piston is moving upwardly relatively to the cylinder the ball valve 40 being closed, the space 25 in the cylinder will be enlarged and liquid fuel will be drawn through opening 17 which is connected with the opening of pipe 6 the latter of which by suitable connection screws on the screw threads on the bottom of the nut 14, from the rear tank into the space 25. As the piston moves downwardly relative to the cylinder the space 25 will be decreased and with the ball valve 19 closed some of the liquid in the space 25 will be forced upwardly past the ball valve 40 through openings 42 into the liquid receiving space 43 of the tank.

The space 43 of the tank communicates with the carburetor through joint 56' connecting with pipe 4 so that the liquid in the space 43 will feed out to the carburetor as needed. Normally the vibration of the car will keep the liquid at approximately a constant level in the chamber 43 and if it rises so as to fill the space 44 or partly fill the same in the piston head 33 then the liquid in the space 44 being incompressible, and being allowed to flow out only slowly through openings 49 and 50 due to their size this incompressible liquid in the space 44 will act as a damper to dampen the further upward movement of the piston head 33 and piston. So long as there is only air in the space 44 there is not much material dampening against the movement of the piston but as liquid gets into the space 44 due to the height of the same in the tank this dampening action becomes effective. In this way complete overflowing of the tank is prevented as the pumping action is stopped by the damper when the height of the liquid is sufficient to fill the space 44. As the liquid in the space 43 recedes after the movement of the piston has been damped the piston will again be allowed to freely vibrate from the vibration of the casing 8.

The space 26 between the nut 14 and sleeve 28 being connected through opening 27 with the hole 17 in the nut will at all times be partially filled with air and partially with liquid and this space forming an air cushion will tend to allow a more continuous flow of the column of liquid in the feed pipe 6 and thereby reduce the resistance to the flow of liquid which exists when the flow would have to be entirely stopped and started at each operation of the pump. By providing this air space in communication with the feed pipe some of the liquid will flow in to compress the air in the space 26 when the ball valve 19 closes and the air, being under pressure, will tend to more quickly cause the flow of liquid upwardly past the valve 19 than if the whole inertia of the column of liquid had to be overcome back to the rear tank before the flow started.

What we claim is:

1. In a liquid receiving tank the combination of a casing; a pump mechanism within said casing, said mechanism including a freely movable piston; and means within and connected to the casing for controlling the movement of said piston without limiting the forces tending to operate said piston nor increasing the pressure in the pump mechanism, said means being dependent upon the amount of liquid within said casing.

2. The combination of a pump cylinder; a receiving tank connected therewith and adapted to be moved by external vibrations imparted thereto; an inertia piston loosely fitting in the cylinder; means for yieldably holding the inertia piston at a point of balance; a dampening chamber in the inertia piston; a cap for the receiving tank; and a hollow piston secured loosely to the cap and working in the dampening chamber, said dampening chamber being connected by openings with the receiving chamber of the tank and with the interior of the hollow piston whereby liquid may flow from the receiving chamber into the dampening chamber and into the hollow piston when the liquid in the tank reaches a predetermined level to restrict further pumping action of the inertia piston relative to the cylinder.

In testimony whereof, we affix our signatures.

CHESTER H. BRASELTON.
FRED B. MacLAREN.